July 25, 1939.   J. BRUNSWICK   2,166,927
MEANS FOR COOLING MULTICELLULAR RUBBER TIRES
Filed March 12, 1936   2 Sheets-Sheet 1

Inventor
Jules Brunswick
By Pennie Davis Marvin & Edmonds
Attorneys

July 25, 1939.  J. BRUNSWICK  2,166,927

MEANS FOR COOLING MULTICELLULAR RUBBER TIRES

Filed March 12, 1936  2 Sheets-Sheet 2

Inventor
Jules Brunswick
By Jennie Davis Marvin & Edmonds
Attorneys

Patented July 25, 1939

2,166,927

UNITED STATES PATENT OFFICE 2,166,927

MEANS FOR COOLING MULTICELLULAR RUBBER TIRES

Jules Brunswick, Paris, France, assignor to Maurice Baudou, Rene Baudou, both of Les Eglisottes, Gironde, France, and himself Application March 12, 1936, Serial No. 68,471
In France March 14, 1935

17 Claims. (Cl. 152—153)

The present invention relates to multi-cellular rubber tires for vehicle wheels, and more especially to multi-cellular rubber tires provided with two series of partitions, extending longitudinally and transversely, respectively, said partitions being moulded in a single piece, said rubber tires including a longitudinal conduit along the rim of the wheel, and being intended to be fitted on a rim which is itself provided with a longitudinal cooling conduit.

The object of the present invention is to provide a ventilating and cooling device for tires of this kind which is capable of causing air from the outside to flow through the cells of the tire, said device being arranged in such manner that the whole is elastic.

According to an essential feature of the present invention, the ventilation and cooling effect which evacuates to the outside the heat that is formed in the tire results from the movements of the air that fills the recesses or cells of the tire. Every time a cell passes close to the ground and directly supports the weight of the vehicle, its volume is reduced so that a portion of the air contained therein escapes into the adjacent cells. Then, as the wheel further rotates, the cell is brought back to its initial volume and an amount of air equal to that precedingly expelled therefrom enters the cell in question. The air thus displaced is led toward the longitudinal conduit which is provided along the rim. Then this rim ensures cooling by conductibility and due to its contact with the ouside. On the other hand it permits direct exchanges of heat with the outer air.

This last effect is made possible by the fact that the rim is provided with holes which are successively opposed to the direction of running or movement and then hidden by the tire, in such manner that these holes are alternately placed in zones of pressure and suction which ensure interchange of air between the outside and the longitudinal conduit of the rim.

It has been proposed to make use of metallic blocks provided with suitable holes and housed inside the longitudinal conduit of the tire. But this device has the disadvantage of giving a tire which is not wholly elastic.

On the contrary, according to a prefered embodiment of the present invention, the rim is arranged in such manner as to provide against it a circulation conduit communicating with the external air, and the longitudinal conduit of the tire receives rubber blocks provided with holes arranged in such manner as to connect the various cells of the tire with the cooling conduit of the rim. These rubber blocks, while supporting the tire, not only permit the circulation of air but also contribute to improve this circulation, due to the periodical compressions they undergo, when the wheel is running, every time they come near the ground and therefore directly support the weight of the vehicle.

This arrangement combines various advantages because these blocks have an elasticity corresponding to that of the parts of the tire in contact therewith, and especially the transverse partitions, and move together with them in their displacements, without producing detrimental friction.

Other features of the present invention will result from the following detailed description of some specific embodiments thereof.

Preferred embodiments of the present invention will be hereinafter described, with reference to the accompanying drawings, given merely by way of example, and in which:

Figs. 1 and 4 show that the tire $a$ is provided, on the inside with longitudinal partitions $b$ and transverse partitions $c$, which are obtained simultaneously and as a single unit when moulding the tire, said partitions limiting the cells filled with air which communicate permanently with the longitudinal conduit $d$.

Figure 3:
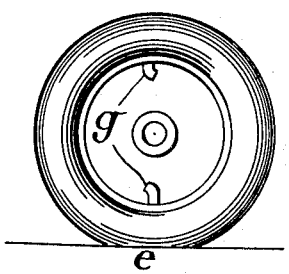

When the tire is running on the ground it is slightly flattened in its part in contact with said ground, at e (Fig. 3), and the cells which correspond to this zone e are also slightly flattened and have their volume reduced. Consequently, a portion of the air they contained is expelled and passes into conduit d. As, nearly immediately, these cells cease to be in contact with the ground, they again expand and the air present in conduit d flows into said cells, so that there is a constant interchange of air between the cells and conduit d.

Conduit d evacuates a portion of the heat that is developed by conductibility, since it is limited by the rim, which is in contact with the outer air. It is thus placed in direct communication with the external air through air funnels g (Figs. 1 and 3), a certain number of which is distributed over the inner periphery of the rim, said funnels being adapted to permit interchange of heat between the inside of the tire and the outside.

The free end of the funnels g may be, for instance, cut at right angles to their axis, or in any other suitable direction provided that, when the tire is running on the ground, each of these funnels serves to the inflow of air for a certain position thereof with respect to the ground, and serves, on the contrary, to the outflow of air for a diametrically opposed position. For instance, with the embodiment of Fig. 3, and for the direction of running of the tire indicated by arrow f, air flows in through funnels g when they are passing at the top of their paths.

Figure 4:
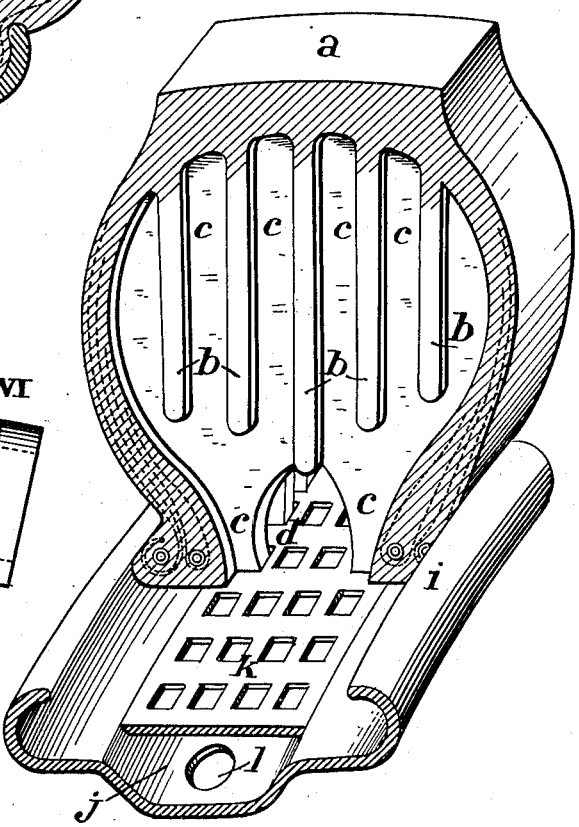
Fig. 4 is a transverse sectional view of a multicellular tire used in connection with a slightly different rim arrangement.

Fig. 4 is very analogous, but it relates to the case of a hollow rim i. The same parts as above referred to are designated by the same reference characters. The hollow or recess j of the rim is limited, on the inner side, by a perforated plate k, and it communicates with the atmosphere through holes l, to which are fixed air funnels, not shown in this figure, but identical to funnels g disclosed by Figs. 1 and 3.

Figure 1:
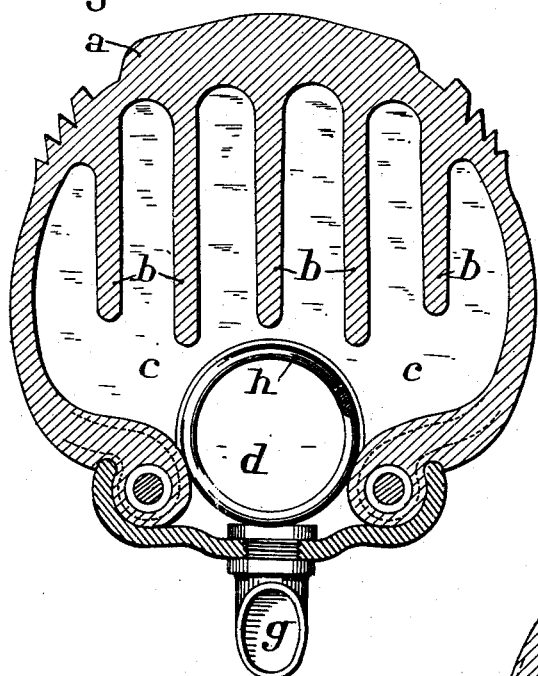
Fig. 1 is a transverse sectional view of a multicellular rubber tire provided with a cooling device acting through interchange of air with the atmosphere, according to the present invention.
Figure 2:
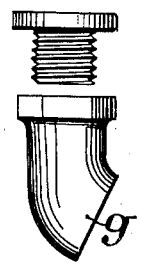
Figs. 2 and 3 are detail views corresponding to Fig. 1.

No device for supporting the longitudinal conduit d of the tire is shown in Fig. 4, while, in Fig. 1, such a device is shown, consisting of a metallic coil spring h.

This metallic spring has the disadvantage that its elasticity is different from that of the tire. Therefore, according to a preferred embodiment of the invention, it is replaced by rubber blocks provided with suitable channels or conduits permitting the circulation of air between all the cells on the one hand and, on the other hand, interchanges of air with the conduit of the rim, which itself communicates with the external air.

Figure 5:
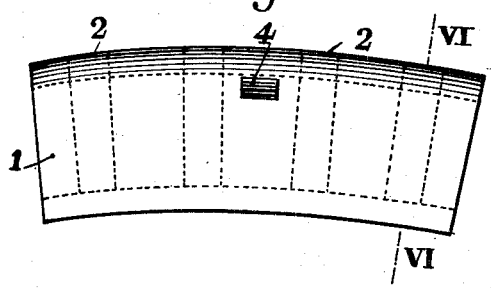
Fig. 5 is an elevational side view of a rubber block according to the present invention.
Figure 6:
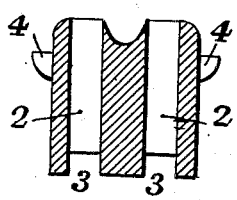
Fig. 6 is a sectional view on the line VI—VI of Fig. 5.
Figure 11:
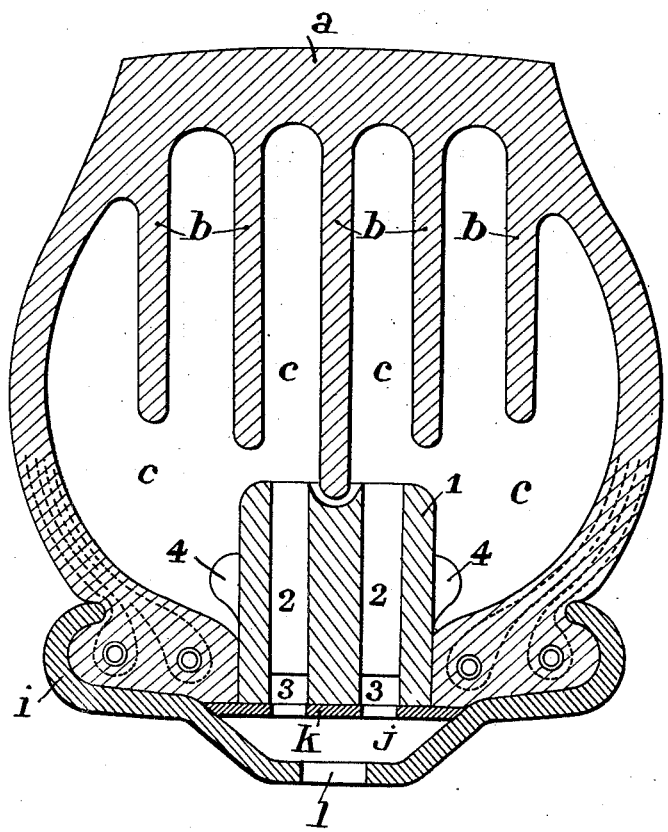
Fig. 11 is a transverse sectional view of a multicellular tire showing how the rubber blocks according to the invention are housed in the longitudinal conduit.

One of these blocks is shown in detail in Figs. 5 and 6. It is provided with radial channels 2 communicating with longitudinal channels 3. These channels 3 are limited by the rim when the block is in position (Fig. 11). Conduits 2 thus connect the various cells of the tire with cooling channel j limited by the hollow portion of rim i. Projections 4 fix the position of the block with respect to the transverse partitions of the tire, and channel 5 corresponds to the longitudinal partition of the tire.

The block shown in Fig. 5 includes but four series of transverse channels but it may be of any length whatever, according to the conditions in which it is manufactured. We may even, instead of a series of rubber blocks, make use of a continuous ring provided with conduits corresponding with each cell and of a shape or dimension such that it is unnecessary to mark the position of this ring with respect to the tire itself in order to be sure to interconnect the various recesses. This ring is first fitted in the conduit or channel of the tire and when the latter is fitted on a wheel, it is elongated together with it.

Figure 7:
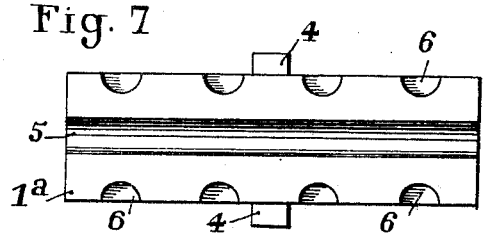
Fig. 7 is a view of the periphery of another embodiment.
Figure 8:
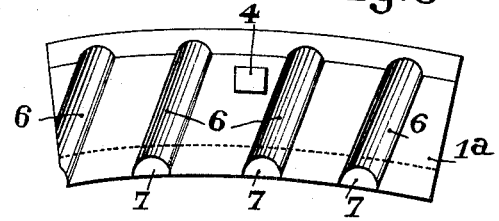
Fig. 8 is a lateral view corresponding to Fig. 7.

In the modification of Figs. 7 and 8, the conduits 2 extending through the rubber mass have been replaced by grooves 6 provided on the lateral surfaces of block 1a, said grooves extending at 7 under the block, so as to communicate with the longitudinal cooling channel.

In Fig. 8, these grooves have been arranged obliquely in such manner that each of them cooperates with a plurality of cells and the position of the blocks in the tire needs not be determined in an extremely accurate manner when fitting the blocks in the tire.

Figure 9:
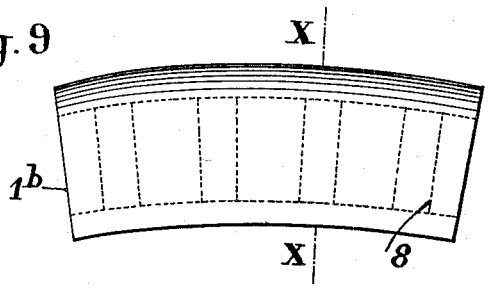
Fig. 9 is a lateral view of a third embodiment of the invention.
Figure 10:
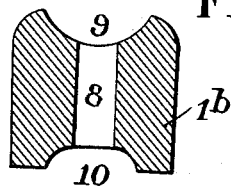
Fig. 10 is a transverse sectional view on the line X—X of Fig. 9.

Finally, in the embodiment of Figs. 9 and 10, block 1b is provided with only one series of conduits 8 located along the axis of the block. These conduits open at both ends into wide longitudinal channels 9 and 10. Channel 9 serves to provide the communication with the cells of the tire, and channel 10 limits, together with the rim, the cooling conduit.

As in the case of the embodiment of Fig. 5, the arrangements according to Figs. 7 and 8 may be provided in the form of continuous rings corresponding to the whole periphery of a wheel, such a ring being inserted in the longitudinal conduit of a tire and being fitted together with said tire of the wheel.

In a general way, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. In combination, a wheel rim having a longitudinal channel formed therein and holes extending through said rim so as to connect said channel with the outside, a cellular rubber tire, provided with a longitudinal conduit, adapted to fit on said rim, and at least one rubber block adapted to fit in said conduit and provided with passages extending throughout said block so as to connect directly and separately the cells of the tire with the space under said block, which communicates with said channel.

2. In combination, a wheel rim having a longitudinal channel formed therein and holes extending through said rim so as to connect said channel with the outside, a cellular rubber tire provided with a longitudinal conduit, adapted to fit on said rim, and at least one rubber block adapted to fit in said conduit, said block being provided on the one hand with a plurality of radial passages extending from the upper side to the under side of said block so as to connect the cells of the tire directly and individually with the space under said block, which communicates with said channel and on the other hand with grooves on said upper and under sides of said block connected with said radial passages, the upper grooves being adapted to cooperate with the various cells of the tire and the under grooves being adapted to cooperate with said channel of the wheel rim.

3. In combination, a wheel rim having a longitudinal channel formed therein and holes extending through said rim so as to connect said channel with the outside, a cellular rubber tire, provided with a longitudinal conduit, adapted to fit on said rim, and at least one rubber block adapted to fit in said conduit said block being provided with a plurality of grooves formed in the lateral faces thereof and extending radially from the upper face to the under face of said block, so as to connect each of the cells of said tire directly and individually with the space under said block, which communicates with said channel.

4. A combination according to claim 1 including a plurality of said rubber blocks.

5. A combination according to claim 1 in which said rubber block forms a continuous rubber ring extending around said rim.

6. A cellular rubber tire comprising a carcass, lateral and longitudinal partitions within said carcass, and integral therewith, forming a cellular or honeycomb structure, a base provided with beads for connection of the tire to the wheel rim, and yieldable means at the base for presenting lateral movement of said beads provided with radial openings for directly and individually ventilating each of the cells of the tire.

7. In combination, a cellular rubber tire comprising a carcass, lateral and longitudinal partitions within said carcass, and integral therewith, forming a cellular or honeycomb structure, a base provided with beads for connection of the tire to the wheel rim, and a yieldable support for said partitions and said beads adapted to transmit part of the tire load directly to said partitions and to relieve the strain on said beads, and to prevent lateral movement of said beads to prevent slipping of the tire, and provided with holes radial of the wheel directly connecting each cell with a longitudinal channel open to the atmosphere provided in the rim to facilitate ventilation of the interior of the tire.

8. A cellular rubber tire comprising a carcass, lateral and longitudinal partitions within, and integral with, said carcass forming a cellular or honeycomb structure, a yieldable support adapted to support such partitions, and provided with radial openings to permit passage of air directly and individually to ventilate each of the cells formed in the carcass by the partitions.

9. In combination, a cellular rubber tire provided with lateral and longitudinal internal partitions integral with said tire, such partitions extending but part way from the tread section to the rim section of the tire, and with a base provided with beads for connection of the tire to the wheel rim, and a yieldable ventilating support for said partitions, adapted to lie between said partitions and the wheel rim, provided with radial openings to permit direct and individual ventilation of each of the tire cells, and adapted to prevent lateral movement of the base beads.

10. A cellular rubber tire comprising a carcass, lateral and longitudinal partitions within said carcass, and integral therewith, forming a honeycomb or cellular structure, said lateral partitions being yieldably supported at the rim, with radial openings at the rim to permit direct and individual ventilation of each of the cells of the tire.

11. A cellular rubber tire comprising a carcass, lateral and longitudinal partitions within said carcass, and integral therewith, forming a honeycomb or cellular structure, a base provided with bead portions for connection of the tire to the wheel rim, said lateral partitions being yieldably supported at the rim, said bead portions being yieldably supported against lateral movement, and radial openings at the base to permit direct and individual ventilation of each of the cells.

12. For use in connection with a wheel rim having a plurality of holes therein distributed over its circumference, a cellular rubber tire which comprises, in combination, a carcass, transverse and longitudinal partitions within said carcass and integral therewith, forming a plurality of cells, said transverse partitions being cut away at the base so as to form together, in said tire, a longitudinal conduit arranged to lie opposite said holes in the rim, and at least one resilient element adapted to fit in said conduit and provided with passages extending therethrough so as directly and individually to connect each of the cells of the tire with the outer face of said element located opposite said holes of the rim.

13. For use in connection with a wheel rim having a plurality of holes therein distributed over its circumference, a cellular rubber tire which comprises, in combination, a carcass, transverse and longitudinal partitions within said carcass and integral therewith, forming a plurality of cells, said transverse partitions being cut away at the base so as to form together in said tire a longitudinal conduit arranged to lie above said holes in the rim, and at least one rubber block adapted to fit in said conduit and provided with passages extending therethrough so as directly and individually to connect each of the cells of the tire with the outer face of said rubber block located opposite said holes of the rim.

14. For use in connection with a wheel rim having a plurality of holes therein distributed over its circumference, a cellular rubber tire which comprises, in combination, a carcass, transverse and longitudinal partitions within said carcass and integral therewith, forming a plurality of cells, said transverse partitions being cut away at the base so as to form together in said tire a longitudinal conduit arranged to lie above said holes in the rim, and at least one rubber block adapted to fit in said conduit and provided with radial holes extending therethrough so as directly and individually to connect each of the cells of the tire with the outer face of said block located opposite said holes of the rim.

15. For use in connection with a wheel rim having a plurality of holes therein distributed over its circumference, a cellular rubber tire which comprises, in combination, a carcass, transverse and longitudinal partitions within said carcass and integral therewith, forming a plurality of cells, said transverse partitions being cut away at the base so as to form together in said tire a longitudinal conduit arranged to lie above said holes in the rim, and at least one rubber block adapted to fit in said conduit and provided with radial holes extending therethrough so as directly and individually to connect each of the cells of the tire with the outer face of said block located opposite said holes of the rim, longitudinal passages being further provided between said block and said transverse partitions, whereby said cells communicate each with the adjacent ones.

16. In combination a wheel rim having tire-bead-engaging edges and an intermediate longitudinally-extending aeration channel communicating with the atmosphere, a substantially rigid, perforated cover for said channel, a cellular rubber tire having lateral and longitudinal internal partitions integral therewith and a base provided with beads for engaging said edges of the wheel rim, and a yieldable support for the lateral partitions and said beads positioned on said perforated channel cover between said beads, said yieldable support having holes directly connecting the cells formed by said lateral and longitudinal partitions and the perforations in said cover to facilitate ventilation of the interior of the tire.

17. In combination a wheel rim having tire-bead-engaging edges and an intermediate longitudinally-extending aeration channel communicating with the atmosphere, a substantially rigid, perforated cover for said channel, and a cellular rubber tire having lateral and longitudinal internal partitions integral therewith and a base provided with beads for engaging said edges of the wheel rim, the lateral partitions extending inwardly to and being supported at their inner side by said perforated cover.

JULES BRUNSWICK.